US010366330B2

(12) United States Patent
Yu (10) Patent No.: US 10,366,330 B2
(45) Date of Patent: Jul. 30, 2019

(54) FORMAL VERIFICATION RESULT PREDICTION

(71) Applicant: Synopsys, Inc., Mountain View, CA (US)

(72) Inventor: Jinqing Yu, Fremont, CA (US)

(73) Assignee: SYNOPSYS, INC., Mountain View, CA (US)

( * ) Notice: Subject to any disclaimer, the term of this patent is extended or adjusted under 35 U.S.C. 154(b) by 503 days.

(21) Appl. No.: 13/886,891

(22) Filed: May 3, 2013

(65) Prior Publication Data

US 2014/0330758 A1 Nov. 6, 2014

(51) Int. Cl.
*G06N 5/02* (2006.01)

(52) U.S. Cl.
CPC ...................... *G06N 5/02* (2013.01)

(58) Field of Classification Search
CPC ........... G06N 99/005; G06N 5/04; G06N 5/02
USPC ............................................ 706/12; 716/106
See application file for complete search history.

(56) References Cited

U.S. PATENT DOCUMENTS

| | | | |
|---|---|---|---|
| 7,937,673 B1 | 5/2011 | Kurshan et al. | |
| 7,971,166 B2 | 6/2011 | Seigler et al. | |
| 8,042,078 B2 | 10/2011 | Paruthi et al. | |
| 8,079,000 B2 | 12/2011 | Koelbl et al. | |
| 8,127,261 B2 | 2/2012 | Auerbach et al. | |
| 8,156,462 B2 | 4/2012 | Moon | |
| 8,181,131 B2 | 5/2012 | Baumgartner et al. | |
| 9,372,715 B2* | 6/2016 | Yu | G06F 9/5038 |
| 9,430,595 B2* | 8/2016 | Pandey | G06F 17/504 |
| 9,548,934 B2* | 1/2017 | Wang | H04L 67/322 |
| 9,705,809 B2* | 7/2017 | Zhang | H04L 1/0002 |
| 10,140,403 B2* | 11/2018 | Yu | G06F 17/5036 |
| 2003/0036894 A1* | 2/2003 | Lam | G06F 17/5022 703/19 |
| 2005/0262456 A1* | 11/2005 | Prasad | 716/4 |
| 2006/0212837 A1* | 9/2006 | Prasad | 716/5 |
| 2007/0168988 A1* | 7/2007 | Eisner et al. | 717/126 |
| 2011/0010139 A1* | 1/2011 | Fuhrmann et al. | 703/2 |
| 2011/0161912 A1* | 6/2011 | Eteminan et al. | 717/101 |

(Continued)

OTHER PUBLICATIONS

"Improved SAT-based Bounded Reachability Analysis", Malay K. Ganai, Adnan Aziz, Design Automation Conference, 2002. Proceedings of ASP-DAC 2002. 7$^{th}$ Asia and South Pacific and the 15$^{th}$ International Conference on VLSI Design, Jan. 7-11, 2002. pp. 729-734.*

(Continued)

*Primary Examiner* — Michael B Holmes
(74) *Attorney, Agent, or Firm* — Alston & Bird LLP (57) ABSTRACT

A design verification problem includes a design description and a property to be verified. Feature data is identified from the design verification problem and a result is predicted for the design verification problem based on the feature data. A plurality of verification engines is then orchestrated based on the prediction. Supervised machine learning may be used for the result prediction. Feature data and verification results from a plurality of training test cases are used to train a classifier to create a prediction model. The prediction model uses the feature data of the design verification problem to make a result prediction for the design verification model.

32 Claims, 6 Drawing Sheets

(56) References Cited

U.S. PATENT DOCUMENTS

| | | | | |
|---|---|---|---|---|
| 2011/0184705 | A1* | 7/2011 | Ganai | 703/2 |
| 2011/0307848 | A1 | 12/2011 | Yeung et al. | |
| 2013/0035908 | A1* | 2/2013 | Ivrii et al. | 703/2 |
| 2013/0091505 | A1* | 4/2013 | Yu | G06F 9/5038 718/103 |
| 2013/0145328 | A1* | 6/2013 | Andraus et al. | 716/102 |
| 2014/0136452 | A1* | 5/2014 | Wellman et al. | 706/12 |
| 2014/0157216 | A1* | 6/2014 | Pandey | G06F 17/504 716/106 |
| 2014/0330758 | A1* | 11/2014 | Yu | G06N 5/02 706/12 |
| 2015/0229571 | A1* | 8/2015 | Zhang | H04L 1/0002 709/224 |
| 2015/0295837 | A1* | 10/2015 | Wang | H04L 67/322 370/351 |
| 2016/0125111 | A1* | 5/2016 | Yu | G06F 17/504 716/106 |
| 2018/0144071 | A1* | 5/2018 | Yu | G06N 20/00 |

OTHER PUBLICATIONS

"Bounded Model Checking", Armin Biere, Alessandro Cimatti, Edmund M. Clarke, Ofer Strichman, Yunshan Zhu, Advances in Computers, vol. 58, 2003, pp. 117-148.*

ScienceDirect Elsevier Journal of Parallel and Distributed Computing vol. 74, Issue 7, Jul. 2014, pp. 2561-2573 Trends in big data analytics, Karthik Kambatla, Giorgos Kollias, Vipin Kumar, Ananth Grama.*

IEEE Solid modeling and beyond, A.A.G. Requicha; J.R. Rossignac Published in: IEEE Computer Graphics and Applications ( vol. 12, Issue: 5 , Sep. 1992 ) pp. 31-44, IEEE.*

IEEE Race Logic: A hardware acceleration for dynamic programming algorithms, Advait Madhavan; Timothy Sherwood; Dmitri Strukov Published in: 2014 ACM/IEEE 41st International Symposium on Computer Architecture (ISCA) Date of Conference: Jun. 14-18, 2014 pp. 1-12 IEEE.*

ACM Digital Library 4CeeD: Real-Time Data Acquisition and Analysis Framework for Material-related Cyber-Physical Environments Phuong Nguyen et al., Proceeding CCGrid '17 Proceedings of the 17th IEEE/ACM International Symposium on Cluster, Cloud and Grid Computing, pp. 11-20 Madrid, Spain—May 14-17, 2017.*

Xu, Lin, et al. "Features for SAT," University of British Columbia, Vancouver, BC, Canada, 4 pages, 2012.

Marques-Silva, Joao, et al., "Conflict-Driven Clause Learning SAT Solvers," Handbook of Satisfiability, Armin Biere, Marijn Heule, Hans van Maaren and Toby Walsh (Eds.), IOS Press, 2009, pp. 131-153, ISBN:978-1-58603-929-5-131.

Chen, Jingchao. "Phase selection heuristics for satisfiability solvers." arXiv preprint arXiv:1106.1372 (2011), pp. 1-12.

Een, Niklas, Alan Mishchenko, and Robert Brayton. "Efficient implementation of property directed reachability." Formal Methods in Computer-Aided Design (FMCAD), 2011. IEEE, 2011, 10 pages.

Xu, Lin, et al. "SATzilla: Portfolio-based Algorithm Selection for SAT." J. Artif. Intell. Res.(JAIR) 32 (2008): 565-606.

* cited by examiner

FORMAL VERIFICATION RESULT PREDICTION

FIELD OF ART

This application relates generally to semiconductor circuit design and more particularly to predicting results for formal verification of an electronic design.

BACKGROUND

Modern verification tools use a variety of individual engines based on different algorithms, such as binary decision diagram (BDD) based reachability, propositional or Boolean satisfiability (SAT) based bounded model checking (BMC), interpolations, and property-directed reachability (PDR), to name a few. These engines may have drastically different performances on different problems. Given a design configured as a finite-state machine (FSM), these verification engines check to see whether a certain state can be reached from the initial states. The individual verification engines thus can either prove the property that the improper state cannot be reached, or falsify the property with a trace connecting a valid initial state to the improper state. Verification engines that are primarily designed to prove that an improper state cannot be reached may be referred to as "prove" engines, while verification engines that are primarily designed to trace an initial state to a bad state may be referred to as "falsify" engines.

For a verification problem, the task of engine orchestration is to select and schedule the appropriate engines to run the problem. Engine orchestration is a very challenging problem and may help determine the overall performance of a verification suite. Traditionally, ad-hoc heuristics, combined with trial-and-error, have been used to orchestrate the various engines. This may not be very effective, with success often determined by the experience level of the test engineer, luck, or other variables.

One seminal difficulty in orchestrating a variety of engines based on different solvers and algorithms, each with unique characteristics and capacities, is the lack of a "best" algorithm—an algorithm superior to all others in all, or even most, design test cases. Even a generally slow engine can sometimes be exponentially faster than a generally fast engine, depending on the specific details of a verification problem. More importantly, some engines are designed to falsify a problem, and do not have the ability to prove a problem, while other engines are designed to prove a problem and may be poor at falsification. Today, engines are typically scheduled in a static order, and most, if not all, current orchestration techniques assume that a given verification engine has an equal chance of successfully proving or falsifying any given design.

SUMMARY

Feature data may be extracted from a design verification problem which is then used to make a prediction about whether the design verification problem may be solved by proving the property or falsifying the verification problem. Various verification engines may then be orchestrated to solve the design verification problem based on the prediction. A computer-implemented method for verification analysis is disclosed comprising: obtaining a design description for a semiconductor device; analyzing the design description to identify feature data for the semiconductor device using a directed-acyclic graph (DAG) representation for the design description and unrolling the DAG representation to coordinate sequential elements within the DAG representation; accessing a plurality of verification engines to verify the semiconductor device; and orchestrating the plurality of verification engines, based on the feature data wherein the orchestrating selects one of a falsification engine and a prove engine to be utilized first in a verification process for the semiconductor device.

The orchestrating may be based on machine learning. The machine learning may include supervised machine learning. A classifier model may be trained based on historical verification data. A support-vector machine may be used as a classifier model for the classifier. The feature data may include one or more of problem size features, variable-clause graph features, clause graph features, balance features, learned clauses features, clause propagation features, or DPLL features. The feature data may be determined using a bounded model checking (BMC) algorithm. The method may further comprise generating a conjunctive normal form (CNF) description for a verification problem. Multiple instances of the CNF description may be used to describe the DAG representation that is unrolled. The method may further comprise computing a set of statistics of a SAT solver and using the set of statistics to determine the feature data. The set of statistics of the SAT solver may be computed for the multiple instances of the CNF description. The unrolling may include explicit unrolling. The unrolling may include implicit unrolling. The unrolling may evaluate the sequential elements across a plurality of cycles. The plurality of cycles may include evaluation of future states from a current state for the sequential elements. The feature data may be collected statistically on the DAG representation that is unrolled. The orchestrating may include selecting and scheduling verification engines. The scheduling may include an order for executing the verification engines. The falsification engine may include one or more of a BMC engine or an ATPG engine. The prove engine may include one or more of an interpolation engine, a property directed reachability (PDR) engine, or a binary decision diagram (BDD) engine. The design description may include a verification problem and the verification problem is represented as a circuit design model. The circuit design model may be represented using the DAG representation. The graph may include a signal to be verified. The method may further comprise using a falsification engine to identify bugs in the semiconductor device. The method may further comprise using a prove engine to identify unreachable code in the design description. The method may further comprise predicting a verification result.

In embodiments, a computer system for verification analysis may comprise: a memory which stores instructions; one or more processors coupled to the memory wherein the one or more processors are configured to: obtain a design description for a semiconductor device; analyze the design description to identify feature data for the semiconductor device using a DAG representation for the design description and unrolling the DAG representation to coordinate sequential elements within the DAG representation; access a plurality of verification engines to verify the semiconductor device; and orchestrate the plurality of verification engines, based on the feature data wherein the orchestrating selects one of a falsification engine and a prove engine to be utilized first in a verification process for the semiconductor device. In some embodiments, a computer program product embodied in a non-transitory computer readable medium for verification analysis may comprise: code for obtaining a design description for a semiconductor device; code for analyzing the design description to identify feature data for the semiconductor device using a DAG representation for the design description and unrolling the DAG representation to coordinate sequential elements within the DAG representation; code for accessing a plurality of verification engines to verify the semiconductor device; and code for orchestrating the plurality of verification engines, based on the feature data wherein the orchestrating selects one of a falsification engine and a prove engine to be utilized first in a verification process for the semiconductor device.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Many different model-checking based formal property verification techniques have been proposed to verify hardware designs. Formal engines can be classified as either a falsify engine or a prove engine, and formal verification engines based on different algorithms may have drastically different performances on different problems. Given a hardware design and a property, it is a very difficult task to decide which engine or engines will achieve a result in the least amount of time. Predicting the verification result of a problem with high confidence hinges on the ability to use minimal computation resources to choose an engine suited to a particular verification problem, thus producing a result more efficiently.

Given a finite-state machine (FSM), model checking is an automatic formal verification technique that checks whether an improper state can be reached from the initial states. A model checker thus can either prove the property that the bad state cannot be reached or falsify the property with a trace connecting the initial state to the bad state. Model checking applied to modern complex chip designs is a very computationally intensive task. A difficult verification problem may typically take hours or even days for a state-of-the-art commercial tool to solve.

Various types of validation engines may be used for various embodiments. Some engines may use a binary decision diagram (BDD) based symbolic technique, while other may use bounded model checking (BMC), interpolation, property directed reachability (PDR), or other algorithms. Different engines may be better suited for different results. Some engines may be designed to falsify a problem, but may not have the ability to prove a problem. These engines may be referred to as falsify engines. Examples of falsify engines include a BMC engine and an automatic test pattern generation (ATPG) engine. Other engines may be designed to prove a problem, but may be very poor at falsification. These engines may be referred to as prove engines. Examples of prove engines include an interpolation engine, a PDR engine, and a BDD engine. Given a new verification problem, determining a good sequence in which to run the engines may help to achieve a result with the least amount of computation.

By predicting whether a particular problem is most likely to be proved or falsified, it may be possible to orchestrate the various verification engines to reduce the amount of computation required to verify the problem as compared to a random or fixed orchestration. Various features may be extracted from the problem and then used to predict which type of engine, such as a falsify engine or a prove engine, are more likely to solve the problem. In at least one embodiment, a classifier is used to evaluate the extracted features and to orchestrate the verification engines. Machine learning may be used to predict a result based on the extracted features. The orchestration may then select which verification engines to use and schedule the running order of the verification engines.

For embodiments where machine learning is used, a set of benchmarks may be used to train the classifier. A set of verification engines may be run on the benchmarks to determine which engine(s) most efficiently solve(s) the problem and how the problem is solved (e.g. prove or falsify). Features may be extracted from the benchmark designs. The features extracted from the benchmark designs, along with information about how the problem was solved, the identity of the engine(s) that were able to solve the benchmarks, data showing whether the engine was a falsify engine or a prove engine, and the amount of computation time used by the engine to solve the problem, may then be used to train the classifier. Once the classifier is trained, the solution for a new design problem may be predicted, along with, in embodiments, information stipulating which verification engine is able to solve the problem. This sequence is enabled by extracting the features from the new design problem and using the classifier to predict whether a falsify engine or a prove engine is more likely to be able to efficiently evaluate the problem. Some embodiments may select a particular engine or a group of engines. A list of engines arranged to run in a particular order is generated in some embodiments.

For the formal verification of hardware, a verification problem may be represented as circuit design model and a property to be verified. The model may be in any format, but may be in the format of a directed-acyclic graph (DAG) in some embodiments. The property to be verified may be represented as an edge on the graph and feature data may be determined for the particular verification problem.

In at least one embodiment, feature data may be computed using bounded model checking. Bounded model checking (BMC) unrolls the transition relation of a system M for bounded k cycles, and checks if any bad state can be reached within k cycles from the initial states. This evaluation can be translated to the Boolean SAT problem given by the following formula:

$$I(s_0) \cap \bigcap_{i=1}^{k} T(s_{i-1}, s_i) \cap \bigvee_{i=1}^{k} (\neg P(s_i))$$

In the formula, $s_0, \ldots, s_k$ are state variables, $I(s_0)$ represents the initial state, $T(s, s')$ denotes a transition relation from a state s to another state s', and P is a predicted property over all the states. If this formula is satisfiable, then there exists a counter example trace of a given length, k or less, that can falsify the property P. Otherwise, the property holds for k cycles.

A BMC engine run gives either a bounded proof result for certain depth or a falsification result. Small depth (i.e. small k) BMC runs are typically very fast and may give some initial information on a given problem. Results from large depth (i.e. large k) BMC runs may approximate a final verification result. These characteristics of BMC may allow the statistics data gathered during a BMC run to be useful for predicting the final verification result. So, in some embodiments, a small number of steps (i=1 to k with a small k value) of a BMC algorithm may be run, and a conjunctive normal form (CNF) generated for the problem at each step (each i value). A SAT solver may be run on the CNF and statistics, which may include static and/or runtime information, may be gathered. The statistics may be used as at least a part of the feature data for the design problem. Any SAT solver that allows statistics to be gathered may be used, including, but not limited to, one of the versions of SATzilla from the University of British Columbia.

Any aspect of the design problem may be used for the features, but in some embodiments, the feature data may include statistics from the SAT solver for the CNF generated at the various steps of the BMC. Depending on the embodiment, the feature data may include, but is not limited to, one or more of problem-size features, variable-clause graph features, variable graph features, clause graph features, balance features, proximity to features, learned-clauses features, clause-propagation features, Davis-Putnam-Logemann-Loveland (DPLL) features, linear programming (LP) based features, local search probing features, or timing features. Statistics on the various extracted features may be compiled from the various CNFs generated for the steps in the feature data for the design problem. Statistics such as mean, variation coefficient, min, max, entropy, percentile points, or other statistical measures may be calculated. Any set of the various features computed for the various CNFs and/or statistics calculated may be combined into a feature data vector for a design problem, and the feature data vector may then be used to predict whether the design problem will be proved or falsified.

Examples of problem size features include, but are not limited to, the number of variables in the CNF, the number of clauses in the CNF, the number of variables and/or clauses after simplification, the number of variables and/or clauses reduced by simplification, and a ratio of variables to clauses. Examples of variable-clause graph features include, but are not limited to, variable node degree and clause node degree. Examples of variable graph features include, but are not limited to, node degree and diameter. Examples of clause graph features include, but are not limited to, node degree and clustering coefficient. Examples of balance features include, but are not limited to, a ratio of positive to negative literals in the clauses, a ratio of positive to negative occurrences of the variables, and a fraction of unary, binary, and ternary clauses.

Examples of proximity to features include, but are not limited to, a fraction of clauses and a number of occurrences in a clause for the variables. Examples of learned clause features include, but are not limited to, a number of learned clauses, and lengths of learned clauses. Examples of clause propagation features include, but are not limited to, confidence of clause propagation, and unconstrained variables. Examples of DPLL features include, but are not limited to, a number of unit propagations computed at different depths, and a search space size estimate. Examples of LP-based features include, but are not limited to, integer slack vectors, a ratio of integer variables in an LP solution, and the objective value of an LP solution. Local search probing features may be calculated using short, time-limited SAT runs, which may be performed with scaling and probabilistic smoothing (SAPS) and/or greedy SAT (GSAT) algorithms. Examples of local search probing features include, but are not limited to, the number of steps to the best local minimum, the average improvement to best in a run, a fraction of improvement due to a first local minimum, and the coefficient of variation of the number of unsatisfied clauses in the local minimums. Examples of timing features include, but are not limited to, processing time used for various computations.

The various feature data described may have different ranges. In some embodiments, the feature data may be scaled to have a common range, such as from −1 to 1 or from 0 to 1. Scaling the feature data may minimize the chance of features with a larger range dominating other features with smaller ranges, in addition to helping numerical stability.

In some embodiments, supervised machine learning may be used for predicting which type of engine is optimal for a design problem based on the feature data vector. A set of benchmark design problems may be used to generate training data. The benchmark design problems may be evaluated against a variety of verification engines to determine how the problems are solved and, in some embodiments, which verification engine or engines may most efficiently solve the various benchmark problems. In one embodiment, each benchmark problem is labeled as either a prove problem or a falsify problem based on how the benchmark problem is solved. In some embodiments, an average time taken by the various prove engines to solve a given benchmark is compared against an average time taken by the various falsify engines to solve the same given benchmark. The type of engine that solves the benchmark with the minimum average time may be used to determine the label. In other embodiments, whichever engine has the overall fastest solve time for a given benchmark can be used to determine the label for that benchmark. Other embodiments may use different algorithms to label the benchmarks.

The benchmarks may also be analyzed to create a feature data vector as described above. The feature data vectors, along with the labels for the various benchmark design problems may then be used as training data to train a classifier. The classifier may use any type of learning model. Some embodiments may use regularized logistic regression, but other embodiments may use a support vector machine (SVM). The SVM may be computed as a dual SVM model, which may be more computationally efficient to solve than a single SVM model. Given the training set $\{(x^{(i)}, y^{(i)}), i=1 \ldots m\}$, the dual SVM model is shown in the following equation:

$$\max_{\alpha} W(\alpha) = \sum_{i=1}^{m} \alpha_i - \frac{1}{2} \sum_{i,j=1}^{m} y^{(i)} y^{(j)} \alpha_i \alpha_j K(x^{(i)}, x^{(j)})$$

$$\text{s.t. } 0 \le \alpha_i \le C, i = 1, \ldots m$$

$$\sum_{i}^{m} \alpha_i y^{(i)} = 0$$

If a SVM model is used, a kernel $K(x^{(i)}, x^{(j)})$ for use in the SVM may be selected. Some embodiments may use a linear kernel but other embodiments may use a radial basis function (RBF) kernel. The RBF kernel provides a nonlinear combination of features, and is shown in the following equation:

$$K(x^{(i)},x^{(j)})=\exp(-\gamma\|x^{(i)}-x^{(j)}\|_2^2), \gamma>0$$

For the use of a SVM classifier model with the RBF kernel, two parameters (C, γ), may be selected, where C is the penalty parameter of the error term and γ is the parameter used by the RBF kernel. Various embodiments may use various values for the parameters, but in at least one embodiment, the parameters can be chosen as (C, γ)=(2, 2).

Any number of benchmark problems may be used, but in some embodiments, at least 50 benchmark design problems are used for training the classifier. In at least one embodiment, over 400 benchmark design problems are used for training the classifier. Once the classifier has been trained, it may be used to make predictions for new design problems based on the problems' feature data vectors. The prediction may simply be a binary output showing whether the new design problem will be proved or falsified, although some embodiments may make a prediction for a specific validation engine or may recommend a validation engine with some other characteristic.

For a typical modern electronic design, there are many design blocks needing verification; this, coupled with the number of automatic generated properties for each design blocks—often in the millions—renders proper scheduling of the verification engines to minimize time to solve the individual design problems highly impactful on the time required to verify the overall design. Using a process called engine orchestration, engines may be scheduled to run on a given verification problem. The process of engine orchestration may use the new design problem's generated prediction from the classifier to schedule engine runs. For example, if the classifier predicts that a particular design problem will be falsified, the engines may be orchestrated to run the falsify engines first and only to run the prove engines if no falsify engine is able to solve the problem. Likewise, if the classifier predicts that the design problem will be proved, the engines may be orchestrated to run the prove engines first and only to run the falsify engines if no prove engine is able to solve the problem. Engines may be scheduled to run for a limited time; if the problem is not solved in the time allotted, the next engine may be selected to run. With modern multi-core processors and networked systems, multiple engines may be run in parallel on the same design problem. In such embodiments, if one engine solves the design problem, the other engines can be stopped and a new design problem can be scheduled. In some embodiments, multiple design problems may be run in parallel.

Figure 1:
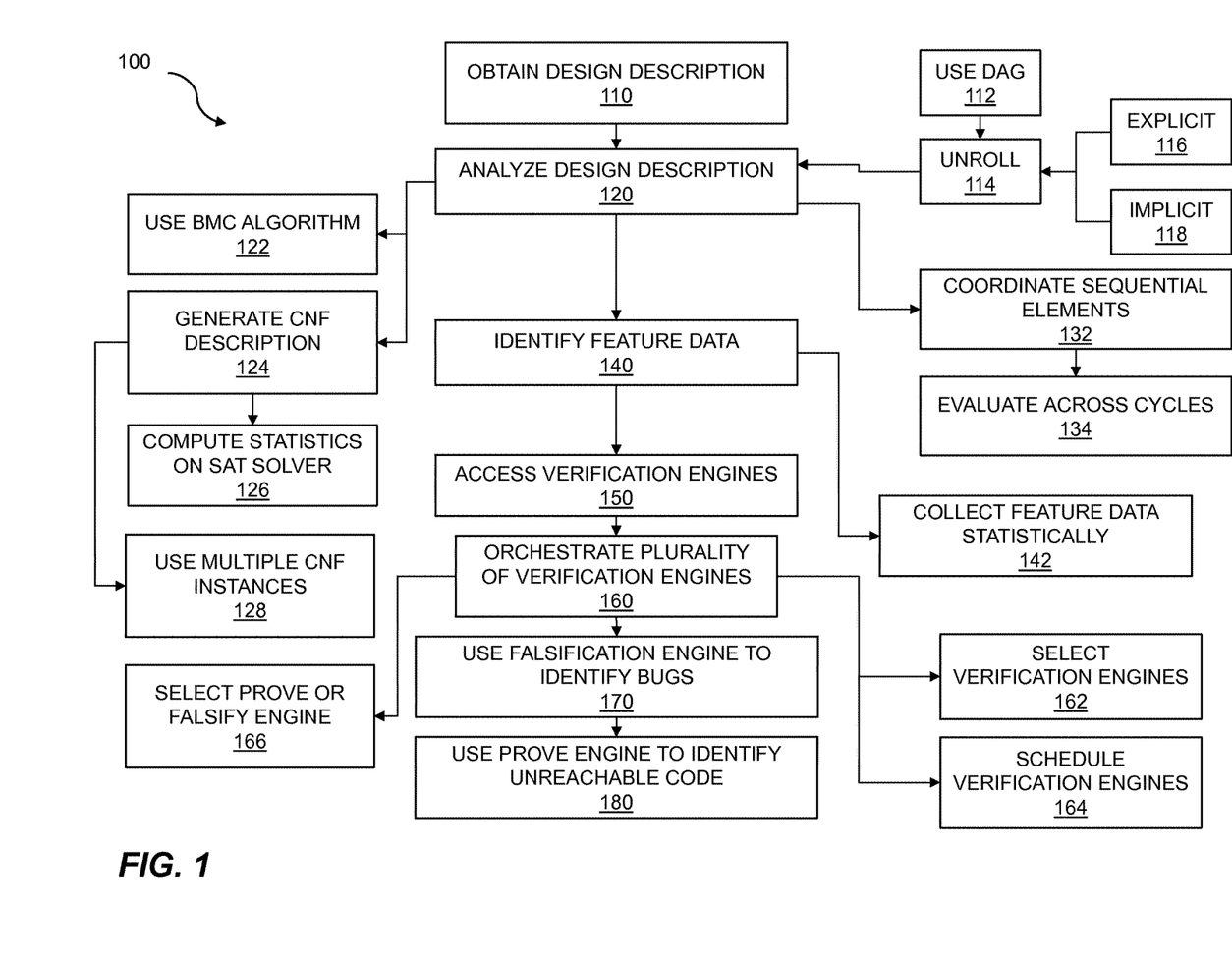
FIG. 1 is a flow diagram for using result prediction in formal verification.

FIG. 1 is a flow diagram for formal verification. The flow 100 shows a computer-implemented method for verification analysis which includes obtaining a design description 110 for a semiconductor device. The design description may be in any form, including, but not limited to, a register transfer language (RTL), a design description language such as SystemVerilog or VHDL, a schematic, a net list, or a directed-acyclic graph (DAG). If the design description is not in the form of a DAG, some embodiments may convert the design description to the DAG form. In at least some embodiments, the design description includes a verification problem represented as a circuit design model. Further, the circuit design model may be represented using the directed-acyclic graph (DAG) representation. In at least some embodiments, the graph includes a signal to be verified.

The verification problem may include an initial state and a set of valid future states, in some embodiments. Additionally, the verification problem may include one or more constraints defining the stimulus to the design description, and/or a set of test vectors for exercising the design.

The flow 100 also includes analyzing the design description 120 to identify feature data 140 for the semiconductor device using a directed-acyclic graph (DAG) representation 112 for the design description and unrolling the DAG representation 114 to coordinate sequential elements 132 within the DAG representation. In some embodiments the unrolling includes explicit 116 unrolling while some embodiments include implicit 118 unrolling. The feature data may include any type of information extracted from the design description and may include, but is not limited to, one or more of problem size features, variable-clause graph features, clause graph features, balance features, learned clauses features, clause propagation features, or Davis-Putnam-Logemann-Loveland (DPLL) features. In some embodiments, the feature data is collected statistically 142 on the unrolled DAG representation.

In some embodiments, the feature data is determined using a bounded model checking (BMC) algorithm 122. A BMC algorithm unrolls the transition relation of a design description for a fixed number of cycles and checks to see if a bad state can be reached from the initial state(s) within that fixed number of cycles. Some embodiments also include generating a conjunctive normal form (CNF) description 124—which may also be referred to as a product-of-sums Boolean form—for a verification problem, and may also include computing a set of statistics of a satisfiability (SAT) solver 126 using the set of statistics to determine the feature data. In some embodiments, multiple instances of the CNF description 128 are used to describe the unrolled DAG representation and the set of statistics of the SAT solver which are computed for the multiple instances of the CNF description. The unrolling may evaluate the sequential elements across a plurality of cycles 134 and the plurality of cycles may include evaluation of future states from a current state for the sequential elements. The evaluation of the future states from the current state may be used to either prove the problem or to falsify the problem, depending on the engine used and whether or not the problem is satisfiable.

The flow 100 continues by accessing a plurality of verification engines 150 to verify the semiconductor device. The verification engines may include prove engines and/or falsify engines. The flow 100 also includes orchestrating the plurality of verification engines 160 based on the feature data. In embodiments, the orchestrating includes selecting 162 verification engines. In many embodiments, a plurality of verification engines are selected. The orchestrating also includes scheduling verification engines 164. The scheduling includes an order for executing the verification engines on a specific design problem where the order may be determined based on the feature data. In embodiments, the orchestrating selects one of a falsification engine and a prove engine 166 to be utilized first in a verification process for the semiconductor device. In embodiments, the selection of the falsification engine or the prove engine is based on a prediction of how the verification problem will be solved, which is determined based on the feature data extracted from the design problem.

In some embodiments, the flow 100 may further include using a falsification engine to identify bugs 170 in the semiconductor device. The falsification engine may identify a path from an initial state to an improper state, which may be used to identify one or more bugs—errors—in the design description. In some embodiments, the flow 100 may further include using a prove engine to identify unreachable code 180 in the design description. Unreachable code may then be removed to simplify the design since, by definition, it will never be used. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
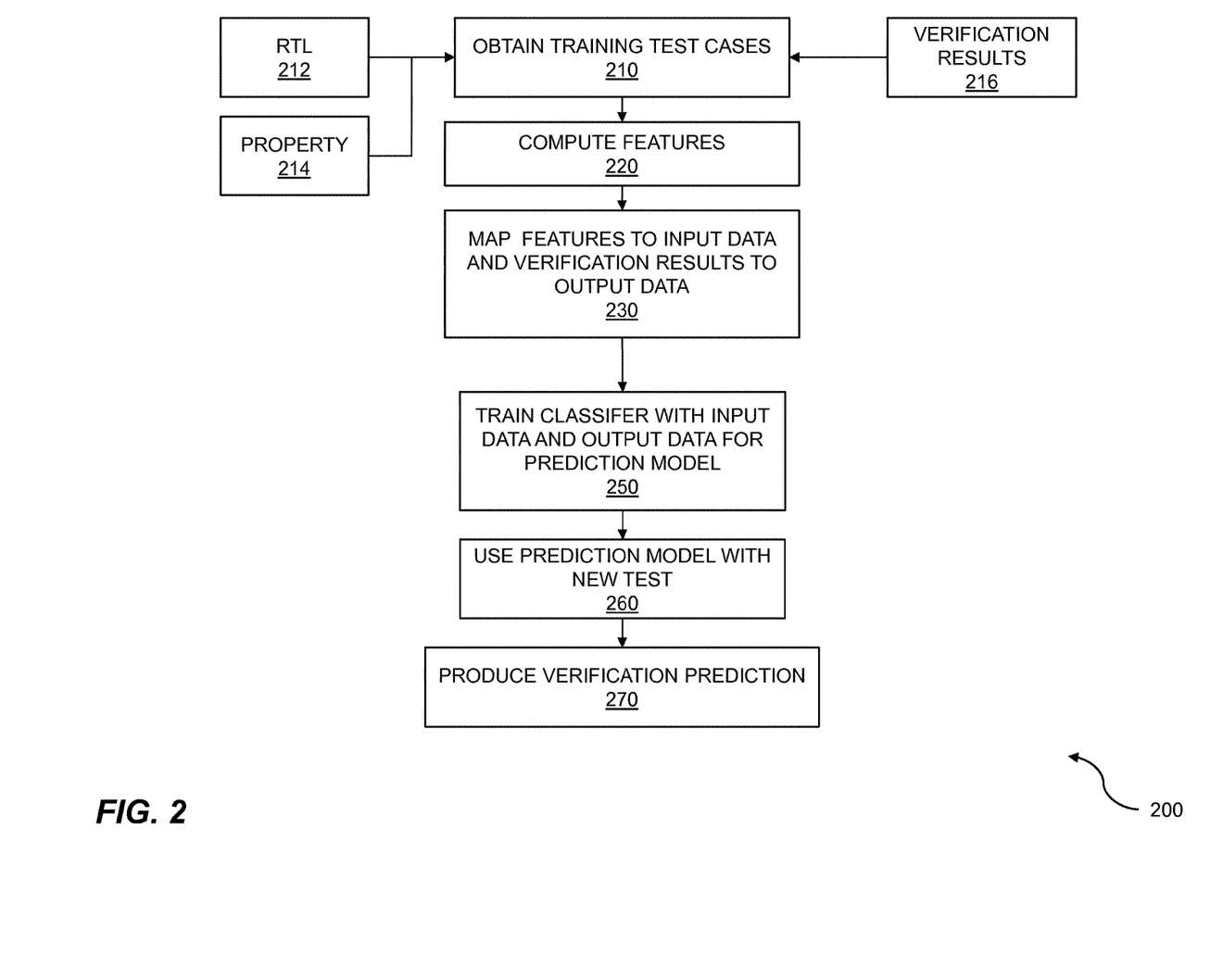
FIG. 2 is a flow diagram for machine learning.

FIG. 2 is a flow diagram for machine learning. The flow 200 includes obtaining training test cases 210. The training test cases may include a register transfer language (RTL) description 212 or some other design description of the design such as a schematic or a functional description. A property 214 to be verified may also be included in the test case. The test case may also include verification results 216 to indicate whether the test case was falsified or proved.

The flow 200 continues with computing features 220 of the training test cases. The features may be any type of feature of the design or any feature that may be computed based on the design, including any of the features described above. The computing of features may also utilize statistics related to the features.

In some embodiments, the machine learning includes supervised machine learning to predict the verification results. The supervised machine learning may utilize a classifier for a two-class classification problem where the two classes are "falsified" and "proved." The training test cases may be prepared for training a classifier by mapping the features to input data and the verification results to output data 230 used for training the classifier. In at least one embodiment, a support-vector machine (SVM) is used as a classifier model for the classifier.

The flow 200 continues by training the classifier with input data and output data for the prediction model 250. Any number of training test cases may be used to train the prediction model. Once the prediction model is trained, the prediction model may be used with a new test 260 to produce a verification prediction 270. A new test may be analyzed to compute feature data to be used as an input to the prediction model. The output of the prediction model may be the verification prediction for the new test. The verification is then used to select which verification engines to run and the order to run them. Thus, the orchestrating is based on machine learning in at least some embodiments. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
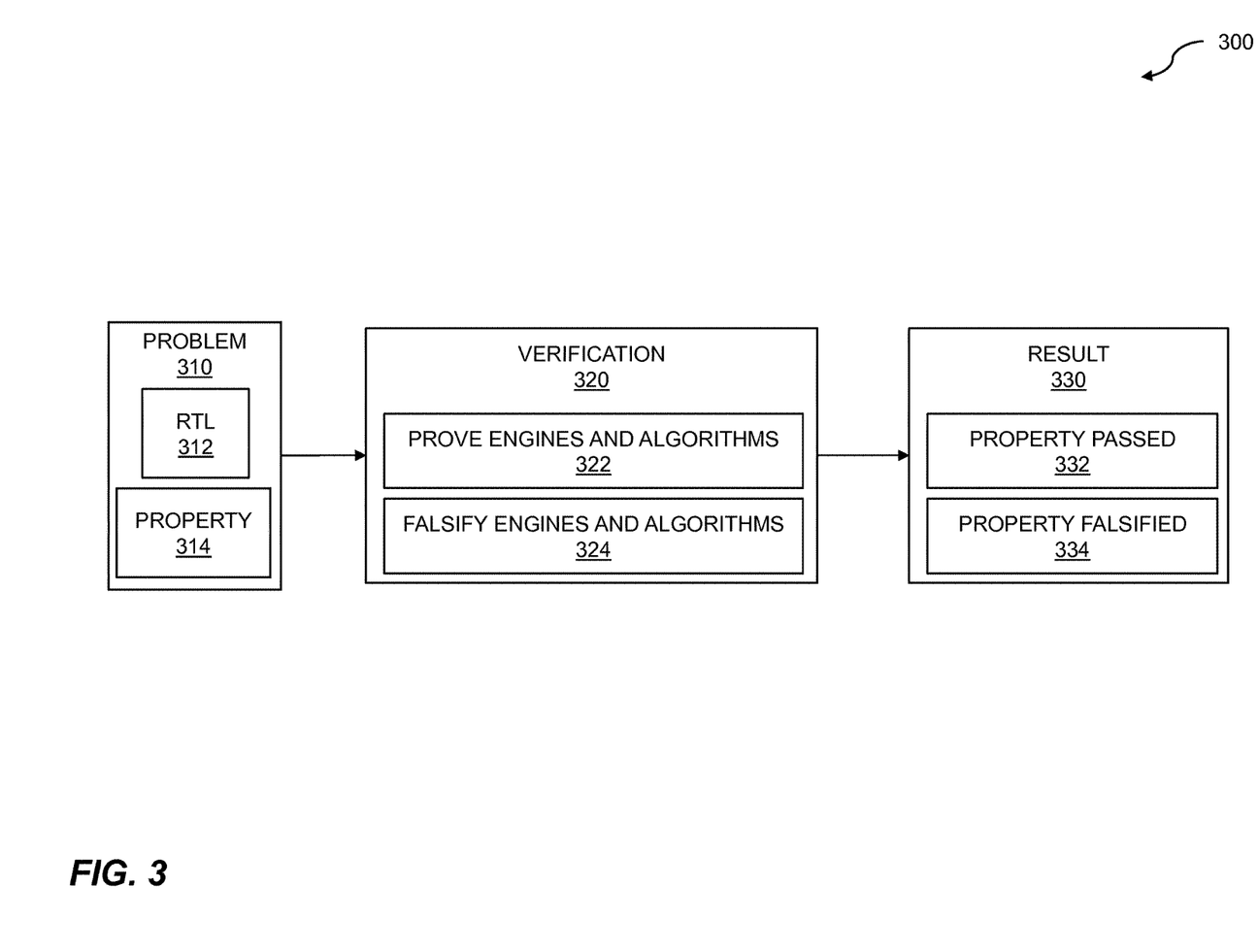
FIG. 3 shows an example verification result.

FIG. 3 shows an example verification result. The example 300 includes a problem 310 to be solved. The problem 310 includes a description of the electronic design, which may be described by any method, but is described using RTL 312 in at least some embodiments. The problem 310 also includes a property 314 to be verified. In some embodiments, the problem may be described using a DAG and the property may represent an edge of the DAG.

The problem 310 is then passed to a verification suite 320. The verification suite 320 may include a plurality of verification engines which may be run on the problem 310. The verification suite may include prove engines and algorithms 322 and falsify engines and algorithms 324. In some embodiments, the falsification engines include one or more of a bounded model checking (BMC) engine and an ATPG engine. In some embodiments, the prove engines include one or more of an interpolation engine, a property directed reachability (PDR) engine, or a binary decision diagram (BDD) engine. An orchestration of the verification engines may also be performed by the verification suite 320. The orchestration may determine which verification engines to run, and the order in which to run them to attempt to solve the problem 310. In some embodiments, a prediction of the verification result for the problem 310 is used to create the orchestration.

A result 330 is produced by the verification suite 320. Any of the verification engines may be used to produce the result. In many embodiments, once a result 330 has been produced by a verification engine in the verification suite 320, other verification engines working on the problem 310 may be halted and any other verification engines scheduled by the orchestration to work on the problem 310 may be cancelled. The result 330 may be either a property passed 332 result, or a property falsified 334 result. If the result 330 is property passed 332, unreachable code may be identified, in some embodiments. If the result 330 is property falsified 334, one or more errors in the design description may be identified.

Figure 4A:
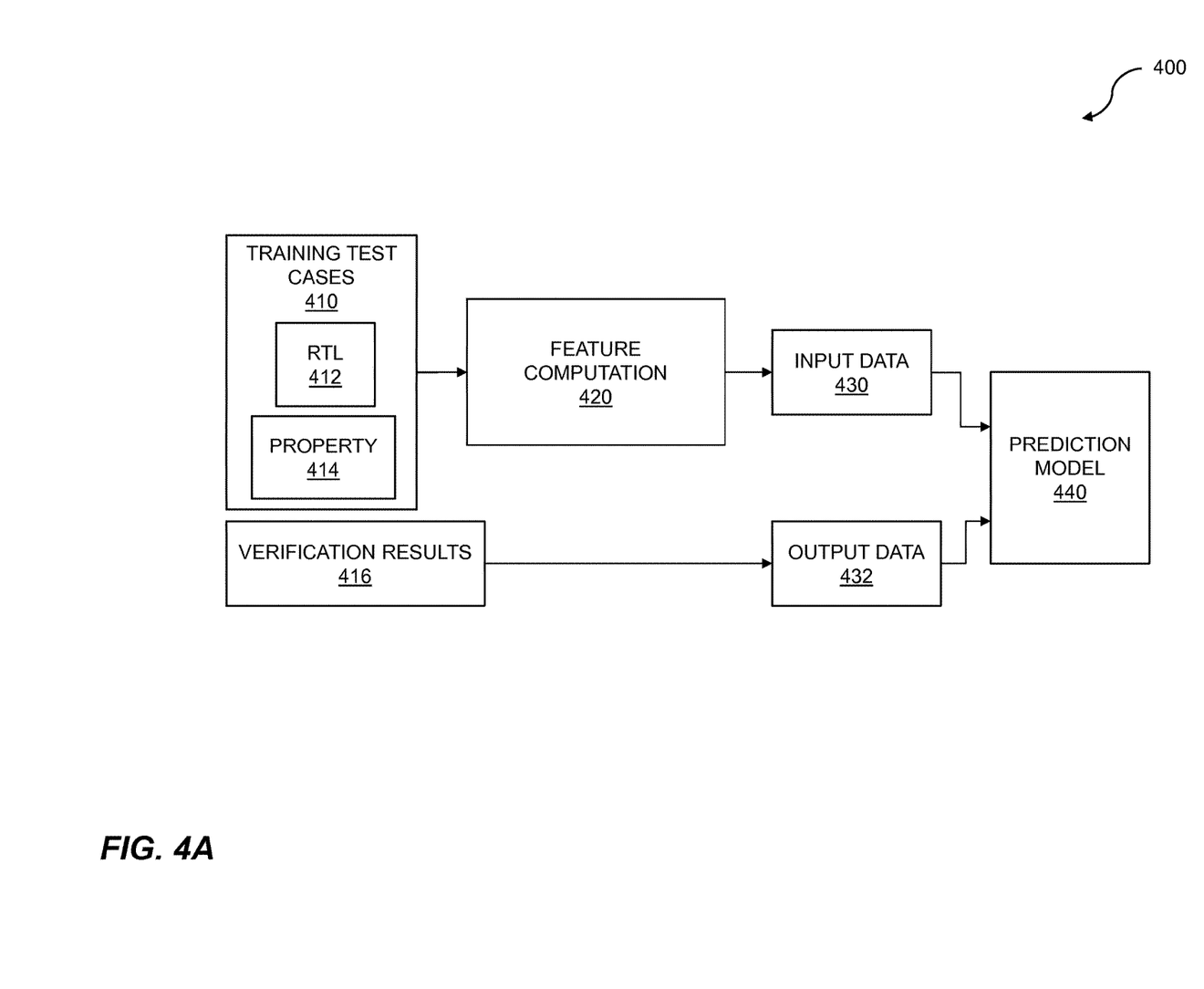
FIG. 4A shows an example training prediction model.

FIG. 4A shows an example training prediction model. The training prediction model 400 includes a plurality of training test cases 410. The training test cases 410 may be historical verification data from previous verifications of earlier versions of a design, previous designs, or artificial test cases, depending on the embodiment. A training test case may include a description of a design—in some embodiments, an RTL description 412—along with a property to be verified 414. Feature data may be computed 420 for the plurality of training test cases 410. The feature data may be any type of feature data including the various types of feature data described in the preceding examples. Verification results 416 for the training test cases 410 are determined. The verification results 416 may be determined by running one or more verification engines on the training test cases 410. In at least some embodiments, the verification result for a particular training test case is selected from proved or falsified.

The computed feature data may be used as input data 430 and the verification results 416 may be used as output data 432 to train a classifier in a prediction model 440. In this way, the classifier model may be trained based on historical verification data. The prediction model 440 may use any type of classifier, but may use a support vector machine (SVM) classification model in some embodiments. The SVM model may use any type of kernel, but may use an RBF kernel in at least some embodiments. Once the input data 430 and output data 432 from the training test cases 410 have been used to train the classifier, the prediction model 440 may be considered to be trained.

Figure 4B:
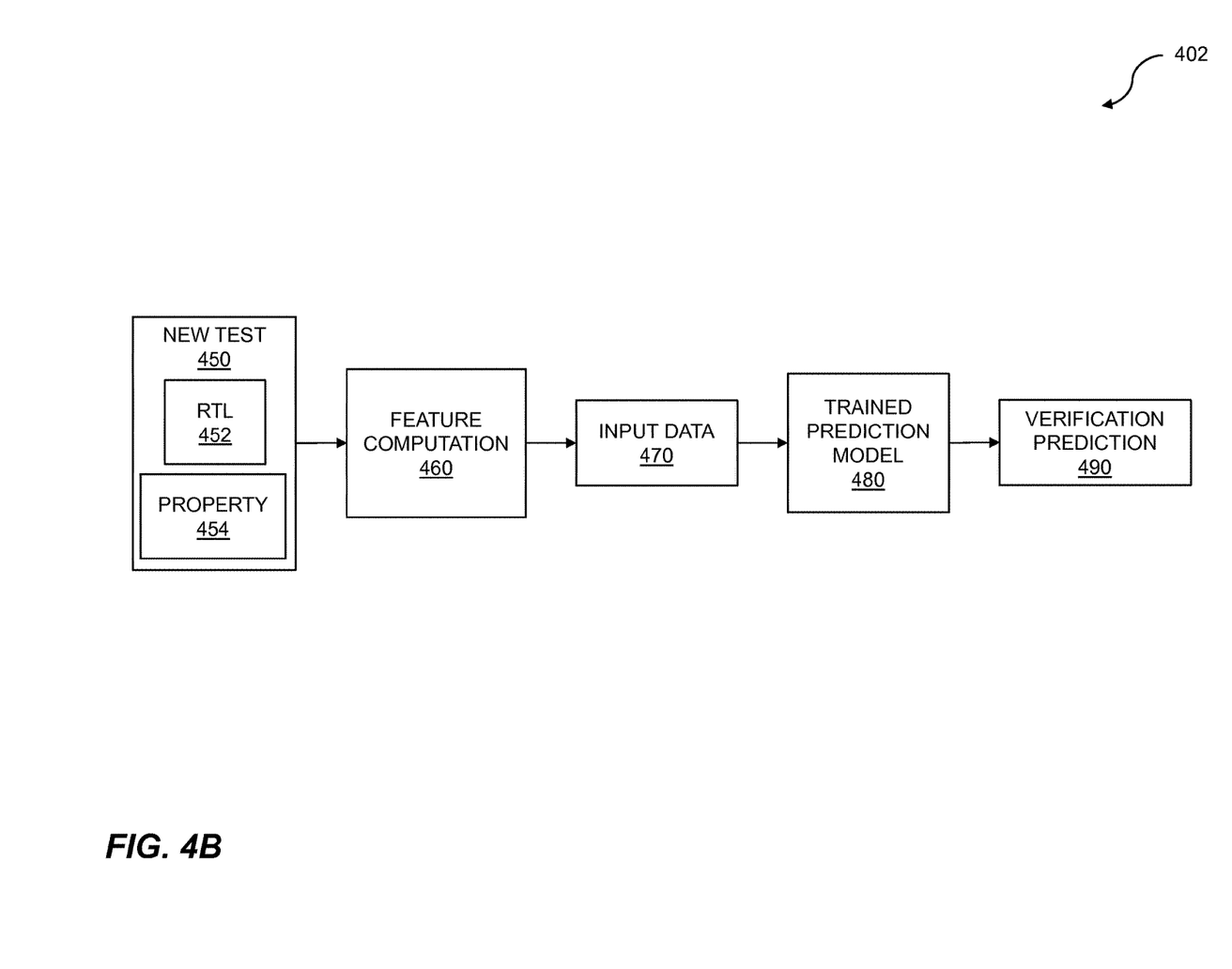
FIG. 4B shows an example new problem output prediction.

FIG. 4B shows an example new problem output prediction. The example 402 includes a new test 450 that includes a description of a design—in embodiments, an RTL description 452—and a property to be verified 454. Feature data may be computed 460 for the new test 450 and used as input data 470 to the trained prediction model 480. The feature data may be any type of feature data, including the various types of feature data described for the preceding examples, but may comprise the same types of feature data that were used to train the classifier in the trained prediction model 480. The trained prediction model 480 may be the same as the prediction model 440 of FIG. 4A, except that it has already been trained. The trained prediction model 480 uses the input data 470 to make a verification prediction 490. The verification prediction 490 may be a prediction that the new test 450 will be proved or falsified. So, the example 402 includes predicting a verification result.

Figure 5:
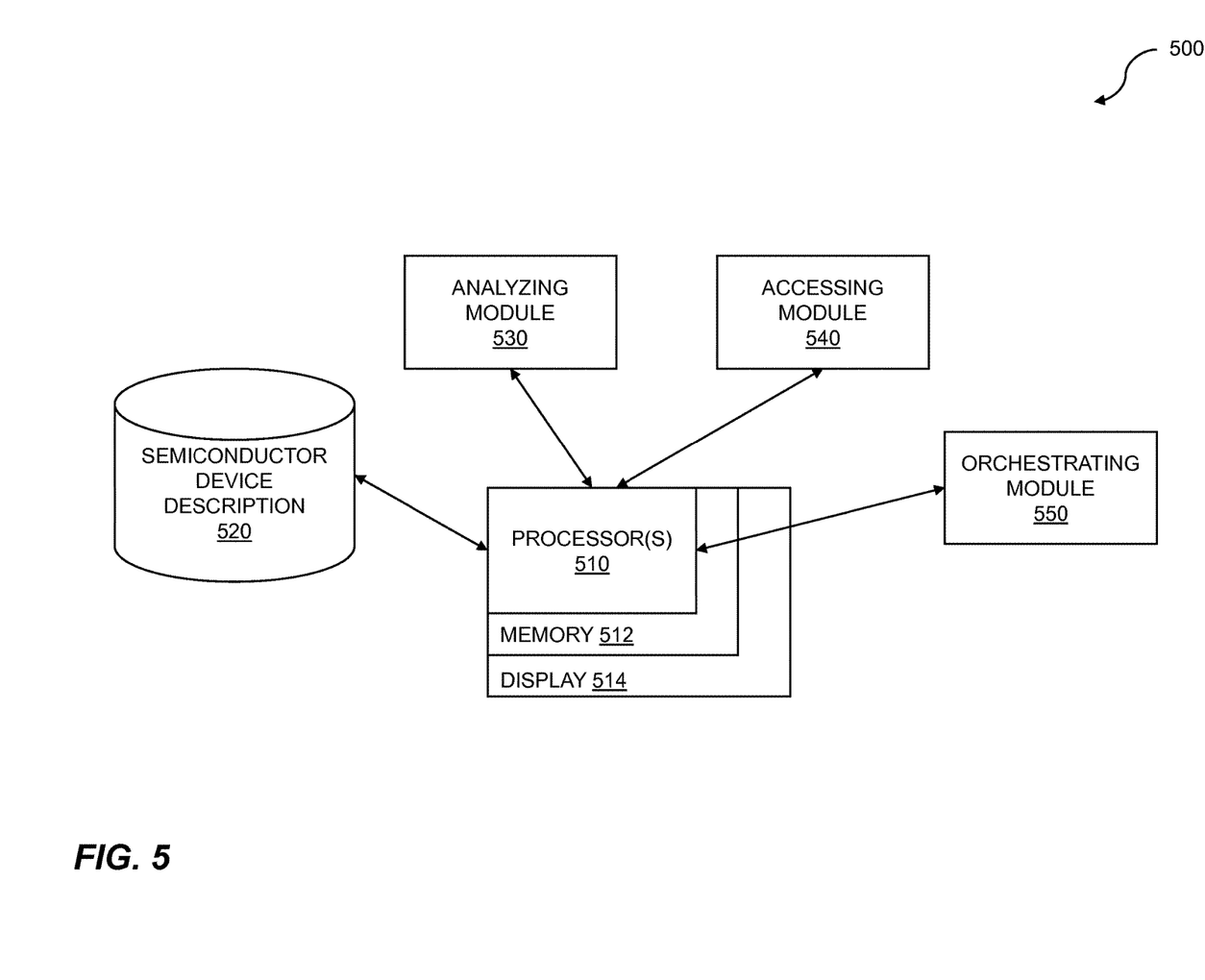
FIG. 5 is a system diagram for formal verification result prediction.

FIG. 5 is a system diagram for formal verification result prediction. The computer system for verification analysis 500 includes a memory 512 which stores instructions, one or more processors 510 coupled to the memory 512, and, in some embodiments, a display 514 to show the problem, the predictions, and/or the results. The display may comprise, but is not limited to, a television monitor, a projector, a computer monitor (including a laptop screen, a tablet screen, a net book screen, and the like), a cell phone display, a mobile device, or another electronic display. The one or more processors 510 are configured to obtain a design description for a semiconductor device 520, and use the analyzing module 530 to analyze the design description to identify feature data for the semiconductor device using a directed-acyclic graph (DAG) representation for the design description. The DAG representation may be unrolled to coordinate sequential elements within the DAG representation. The one or more processors 510 may also be configured to use the accessing module 540 to access a plurality of verification engines to verify the semiconductor device, and use the orchestrating module 550 to orchestrate the plurality of verification engines, based on the feature data. The orchestrating module 550 may select one of a falsification engine and a prove engine to be utilized first in a verification process for the semiconductor device.

A computer program product embodied in a non-transitory computer readable medium for verification analysis may be executed by the one or more processors 510. The computer program product may include code for obtaining a design description for a semiconductor device 520 from storage coupled to the computer system 500, another computer coupled to the system 500 over a network, a user accessing the system 500, or some other location. The computer program product may also include an analyzing module 530 that includes code for analyzing the design description to identify feature data for the semiconductor device using a directed-acyclic graph (DAG) representation for the design description and unrolling the DAG representation to coordinate sequential elements within the DAG representation. The computer program product may also include an accessing module 540 that includes code for accessing a plurality of verification engines to verify the semiconductor device. The computer program product may also include an orchestrating module 550 that includes code for orchestrating the plurality of verification engines, based on the feature data wherein the orchestrating selects one of a falsification engine and a prove engine to be utilized first in a verification process for the semiconductor device.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for verification analysis comprising:
    analyzing a design description for a semiconductor device to identify feature data for the semiconductor device using a directed-acyclic graph (DAG) representation for the design description and unrolling the DAG representation to coordinate sequential elements within the DAG representation, wherein the unrolling evaluates the sequential elements across a plurality of cycles;
    accessing a plurality of verification engines to verify the semiconductor device;
    orchestrating the plurality of verification engines, based on the feature data wherein the orchestrating selects one of a falsification engine and a prove engine to be utilized first in a verification process for the semiconductor device, wherein the prove engine is adapted to ensure that an improper state is not reached and wherein the falsification engine is adapted to trace an initial state to a bad state, and wherein the orchestrating includes selecting and scheduling other verification engines to be utilized in the verification process for the semiconductor device, and wherein the scheduling includes an order for executing the verification engines; and
    predicting a verification result of the semiconductor device design.

2. The method of claim 1 wherein the orchestrating is based on machine learning.

3. The method of claim 2 wherein the machine learning includes supervised machine learning.

4. The method of claim 3 wherein a classifier model is trained based on historical verification data.

5. The method of claim 4 wherein a support-vector machine is used as a classifier model for the classifier.

6. The method of claim 1 wherein the feature data includes one or more of problem size features, variable-clause graph features, clause graph features, balance features, learned clauses features, clause propagation features, or DPLL features.

7. The method of claim 6 wherein the feature data is determined using a bounded model checking (BMC) algorithm.

8. The method of claim 7 further comprising generating a conjunctive normal form (CNF) description for a verification problem.

9. The method of claim 8 wherein multiple instances of the CNF description are used to describe the DAG representation that is unrolled.

10. The method of claim 9 further comprising computing a set of statistics of a SAT solver and using the set of statistics to determine the feature data.

11. The method of claim 10 wherein the set of statistics of the SAT solver are computed for the multiple instances of the CNF description.

12. The method of claim 1 wherein the unrolling includes explicit unrolling.

13. The method of claim 1 wherein the unrolling includes implicit unrolling.

14. The method of claim 1 wherein the plurality of cycles includes evaluation of future states from a current state for the sequential elements.

15. The method of claim 1 wherein the feature data is collected statistically on the DAG representation that is unrolled.

16. The method of claim 1 wherein the falsification engine includes one or more of a BMC engine or an ATPG engine.

17. The method of claim 1 wherein the prove engine includes one or more of an interpolation engine, a property directed reachability (PDR) engine, or a binary decision diagram (BDD) engine.

18. The method of claim 1 wherein the design description includes a verification problem and the verification problem is represented as a circuit design model.

19. The method of claim 18 wherein the circuit design model is represented using the DAG representation.

20. The method of claim 19 wherein the graph includes a signal to be verified.

21. The method of claim 1 further comprising using a falsification engine to identify bugs in the semiconductor device.

22. The method of claim 1 further comprising using a prove engine to identify unreachable code in the design description.

23. A computer system for verification analysis comprising:
    a memory which stores instructions;
    one or more processors coupled to the memory wherein the one or more processors are configured to:
    analyze a design description for a semiconductor device to identify feature data for the semiconductor device using a DAG representation for the design description and unrolling the DAG representation to coordinate sequential elements within the DAG representation, wherein the unrolling evaluates the sequential elements across a plurality of cycles;

access a plurality of verification engines to verify the semiconductor device;

orchestrate the plurality of verification engines, based on the feature data wherein the orchestrating selects one of a falsification engine and a prove engine to be utilized first in a verification process for the semiconductor device, wherein the prove engine is adapted to ensure that an improper state is not reached and wherein the falsification engine is adapted to trace an initial state to a bad state, and wherein the orchestrating includes selecting and scheduling other verification engines to be utilized in the verification process for the semiconductor device, and wherein the scheduling includes an order for executing the verification engines; and predict a verification result of the semiconductor device design.

24. A computer program product embodied in a non-transitory computer readable medium, which when executed by a processor, causes the processor to perform verification analysis, the computer program product comprising instructions that when executed cause the processor to:

analyze a design description for a semiconductor device to identify feature data for the semiconductor device using a DAG representation for the design description and unrolling the DAG representation to coordinate sequential elements within the DAG representation, wherein the unrolling evaluates the sequential elements across a plurality of cycles;

access a plurality of verification engines to verify the semiconductor device;

orchestrate the plurality of verification engines, based on the feature data wherein the orchestrating selects one of a falsification engine and a prove engine to be utilized first in a verification process for the semiconductor device, wherein the prove engine is adapted to ensure that an improper state is not reached and wherein the falsification engine is adapted to trace an initial state to a bad state, and wherein the orchestrating includes selecting and scheduling other verification engines to be utilized in the verification process for the semiconductor device, and wherein the scheduling includes an order for executing the verification engines; and predict a verification result of the semiconductor device design.

25. The computer system of claim 23 further configured to use a falsification engine to identify bugs in the semiconductor device.

26. The computer system of claim 23 further configured to use a prove engine to identify unreachable code in the design description.

27. The computer program product of claim 24 that further causes the processor to use a falsification engine to identify bugs in the semiconductor device.

28. The computer program product of claim 24 that further causes the processor to use a prove engine to identify unreachable code in the design description.

29. The computer program product of claim 24 that further causes the processor to generate a conjunctive normal form (CNF) description for a verification problem.

30. The computer program product of claim 29 wherein multiple instances of the CNF description are used to describe the DAG representation that is unrolled.

31. The computer program product of claim 24 that further causes the processor to compute a set of statistics of a SAT solver and uses the set of statistics to determine the feature data.

32. The computer program product of claim 24 that further causes the processor to determine the feature data using a bounded model checking (BMC) algorithm and generate multiple instances of a conjunctive normal form (CNF) description for a verification problem, wherein the multiple instances of the CNF description are used to describe the unrolled DAG representation and the set of statistics of the SAT solver which are computed, wherein the set of statistics is used to determine the feature data.

* * * * *